(12) United States Patent
Jense

(10) Patent No.: US 6,974,930 B2
(45) Date of Patent: Dec. 13, 2005

(54) LASER SCANNER

(75) Inventor: Willem Frederik Jense, MJ De Lutte (NL)

(73) Assignee: Jense Systemen B.V., De Lutte (NL)

( * ) Notice: Subject to any disclaimer, the term of this patent is extended or adjusted under 35 U.S.C. 154(b) by 0 days.

(21) Appl. No.: 10/488,739

(22) PCT Filed: Sep. 4, 2002

(86) PCT No.: PCT/NL02/00577

§ 371 (c)(1),
(2), (4) Date: Sep. 21, 2004

(87) PCT Pub. No.: WO03/022510

PCT Pub. Date: Mar. 20, 2003

(65) Prior Publication Data

US 2005/0061781 A1   Mar. 24, 2005

(30) Foreign Application Priority Data

Sep. 7, 2001  (NL) .................................. 1018906

(51) Int. Cl.[7] .................... B23K 26/08; B23K 26/02
(52) U.S. Cl. ............................. 219/121.8; 219/121.73; 359/201; 700/166
(58) Field of Search ........................ 219/121.8, 121.67, 219/121.82, 121.73, 121.63; 700/166; 359/201, 359/202

(56) References Cited

U.S. PATENT DOCUMENTS 5,444,212 A * 8/1995 MacNaughton et al. . 219/121.7
5,690,846 A * 11/1997 Okada et al. .......... 219/121.78

FOREIGN PATENT DOCUMENTS

WO   WO-94/03302 A1 * 2/1994

* cited by examiner

*Primary Examiner*—Geoffrey S. Evans
(74) *Attorney, Agent, or Firm*—The Webb Law Firm

(57) ABSTRACT

Disclosed is a device for machining a workpiece transportable in a chosen direction in accordance with a selected pattern by a focussed laser beam. The device includes a scanner with a converging optical system. The scanner has a chosen distance relative to the workpiece. On the basis of the maximum laser output there is defined on the workpiece a certain operating area, of which the linear dimension transversely of the transporting direction is small relative to the dimension transversely of the workpiece. The device further includes computer-controlled displacing device for displacing the scanner substantially perpendicularly of the chosen direction. The scanner is displaced under computer control in transverse direction relative to the longitudinal movement of the workpiece. The machining takes place during the displacement of the scanner. The displacement speed is continuously adjusted to the amount of work available within the operating area of the scanner. The dimensions of the target point have a chosen value at each point on its path.

11 Claims, 5 Drawing Sheets

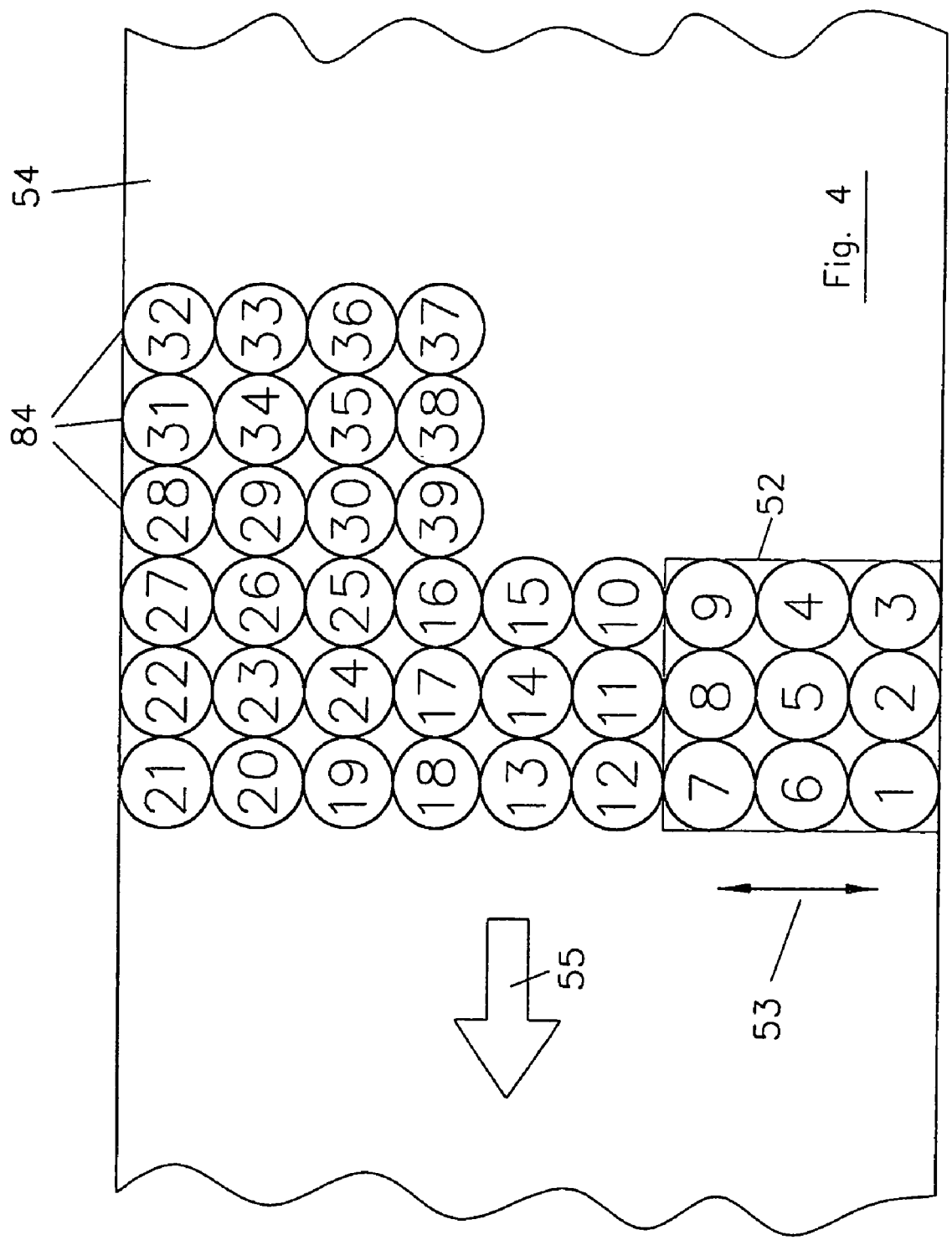

LASER SCANNER

BACKGROUND OF THE INVENTION

The invention lies in the field of machining a workpiece according to a selected pattern by means of a focussed laser beam. Such an operation can for instance be the mutual connection of two metal plates over selected welding zones. A pattern of sandpaper pieces, for instance sanding discs, can also be cut from a strip of sandpaper which is for instance advanced continuously and which is unwound from a roll and wound onto a winding roll after processing. The operations can take place such that the target point of the focussed laser beam on the workpiece runs through a selected path. This path can be continuous or discontinuous. In the case of a discontinuous path, the laser is switched on and off respectively at the necessary moments. Focussing of the parallel, infrared laser beam takes place by means of a converging optical system.

For a proper understanding of the description of the invention following hereinbelow, two prior art examples are mentioned.

The first example relates to a welding operation using a laser, for instance a $CO_2$-laser, with an output of 3000 W, operating area 1500×1500 mm, focal distance 2300 mm, welding speed about 20 mm/s. Due to the large focal distance there is a relatively large target point, whereby the weld is relatively wide, for instance in the order of 2 mm. A relatively large amount of heat is hereby introduced into the material for welding. If for instance a small piece has to be welded in each case on a car door in the four corners, this could be technically acceptable because the displacement times of the laser beam from the one corner to the next corner are negligibly small, i.e. in the order of 0.05 seconds.

A second example relates to the cutting of sandpaper using a laser output of 1500 W, an operating area of 750×750 mm, a focal distance of 1250 mm, a cutting speed of about 600 mm/s. At a material strip width of 1500 mm so-called scanners are for instance used adjacently of each other according to the prior art, which together cover the total material strip width. A scanner comprises a converging optical system for focussing the laser beam at a target point on the workpiece, with moving means for adjusting the spatial position and optionally the angular position of one or more components of the optical system such that the optical distance between this system and the target point of the focussed laser beam on the workpiece is substantially constant, and that the target point runs through a path corresponding with the selected machining pattern, all this under computer control. When sanding discs with a diameter of 125 mm are being cut from the sandpaper strip, the total output of both scanners is 12234 discs per hour.

SUMMER OF THE INVENTION

The basis of the invention is now that a remarkable relation has been found to exist between the operating area and thereby the focal diameter and the cutting speed which can be achieved:

(A) Operating area 750×750 mm, focal distance 1250 mm.

(B) Operating area 500×500 mm, focal distance 850 mm.

(C) Operating area 350×350 mm, focal distance 630 mm.

In cases A and B the ratio of the focal diameter is 1250:850=1.47. The ratio of the surface areas is $1.47^2=2.16$, which means that the cutting speed is more than doubled from 600 mm/s to about 1290 mm/s. In practice there occurs a small loss relative to this theoretical value. 1200 mm/s has been found to be feasible.

A comparison between cases A and C shows that the focal surface areas are in the ratio of $(1250/630)^2=3.92$. This would mean that the cutting speeds would both become four times greater and would reach a value of 2350. In practice a somewhat greater loss occurs here; 1850 mm/s is feasible.

The invention now provides a device for machining a workpiece transportable in a chosen direction in accordance with a selected pattern by means of a focussed laser beam, for instance mutually connecting two metal plates over selected welding zones, cutting sandpaper pieces of selected shapes and dimensions from a continuous sandpaper strip, or the like, which device comprises:

a computer;

a laser controlled by the computer, for instance a $CO_2$-laser, with a continuous output of at least 200 W, which laser generates a substantially parallel beam;

a scanner, comprising:
  a converging optical system for focussing the laser beam at a target point on the workpiece, with moving means for adjusting the spatial position and optionally the angular position of one or more components of the optical system such that the optical distance between said system and the target point is substantially constant and that the target point runs through a path corresponding with the selected pattern,
  which scanner has a chosen distance relative to the workpiece, whereby on the basis of the maximum laser output there is defined on the workpiece a certain operating area, of which the linear dimension transversely of the transporting direction is small relative to the dimension of the workpiece transversely of the transporting direction;

transport means driven by a motor for transporting the workpiece in the chosen direction;

displacing means controlled by the computer for displacing the scanner substantially perpendicularly of said chosen direction;

wherein the computer controls the device such that the machining takes place during the displacement of the scanner, the displacement speed is continuously adjusted to the amount of work available within the operating area of the scanner, and the dimensions of the target point have a chosen value at each point on its path.

In a preferred embodiment the device has the special feature that the scanner comprises:

a converging lens system for focussing the laser beam at a target point, with computer-controlled linear displacing means for adjusting the position of the lens system such that the optical distance between said system and the target point is substantially constant; and a mirror system arranged downstream of the lens system having at least one flat mirror, with computer-controlled rotating means for adjusting the position of the or each mirror such that the target point runs through a path corresponding with the chosen pattern.

Use could be made of only one flat mirror which can be arranged for a sweeping movement in two mutually perpendicular directions by means of the rotating means. Use can be made for this purpose of for instance a mirror with cardan suspension having two sweeping motors providing a sweeping movement in the two mutually perpendicular directions.

A simpler embodiment is that in which the mirror system comprises two flat mirrors, each of which can be set into a sweeping movement by a rotating motor such that they can cause the laser beam to sweep in mutually perpendicular directions.

Each of these mirrors can sweep individually around a rotation axis by means of the motor added to the mirror in question. The advantage of this structure over a cardan suspension is that both mirrors with their drive motors can be identical for both directions.

A specific choice involves the rotation means comprising two galvo-motors.

A specific embodiment of the device according to the invention has the special feature that the dimensions of the target point are substantially equal at each point on its path.

Attention is drawn to the fact that in the case of a workpiece with a three-dimensional structure, for instance a relief, a modified control must be provided whereby the computer-controlled converging optical system meets this requirement.

A specific embodiment has the special feature that the transport means are driven intermittently such that they stand still during a machining phase.

In a preferred embodiment the device has the special feature that the computer control takes place such that the machining takes place at the highest possible speed.

According to yet another aspect of the invention, the device can have the feature that the optical system is free of lenses and only comprises a mirror system with at least one concave mirror, for instance a parabolic mirror.

In order to prevent the unnecessary development of smoke due to burnt workpiece material, the device can advantageously have the special feature, particularly for cutting operations, that the dimensions of the target point are as small as possible.

In a preferred embodiment of the invention the laser beam is focussed by a lens system comprising at least one lens and displaceable along the path of the laser beam, and the converging beam is directed at a flat mirror which can sweep in only one direction. The beam reflected by this first mirror arranged for sweeping is directed at a second flat mirror which is arranged for sweeping such that the laser beam sweeps in a direction perpendicular to the first mirror. The converging beam is then directed at the workpiece, wherein the target point has a chosen diameter. The displaceable lens system can for instance provide the sharpest possible focussing on the surface for machining. This is of particular importance for cutting operations.

The operating area is determined by the laser output, the maximum angles of rotation of the flat mirrors and the distance from the flat mirrors to the surface for machining.

The use of galvo-motors to drive two separate mirrors has the advantage of an identical structure for both directions, while the mass for displacing is relatively small, and it is possible to work very accurately and rapidly owing to the nature of the galvo-motors. The greater speed is particularly importance in the displacement between two operations. The focussed laser beam can for instance be displaced over a distance of for instance 100 mm in a few ms. A very high effective performance of the laser operation can hereby be achieved.

In recent years the art in the field in question has developed in respect of improving the necessary cooling of mirrors and improved reflection coatings on mirrors, whereby these mirrors are increasingly capable of processing higher output rates. About a year ago the limit was around 1000 W continuously or around 1500 W for several seconds. At the beginning of September 2001 the limit was about 2000 W continuously and about 3000 W with a duty cycle of 10 seconds on and 2 seconds off.

A higher output implies that a scanner can be placed at a greater distance from the workpiece and that a greater operating area can thereby be realized per scanner (in the prior art two scanners for one direction are usual). The energy density in the target point required for the operation, for instance welding or cutting, determines the maximally achievable distance and thereby the operating area in combination with the machining speed.

In summary it can be stated that the tendency in the prior art has aimed at realizing a larger operating area by employing a greater output.

According to the invention the scanner is moved in transverse direction over the workpiece. This displacement does not take place discretely but "on the fly". The movement speed is not necessarily constant or uniform but has a value between zero and the maximally attainable value, as described above, depending on the amount of work available within the operating area of the scanner at that moment.

The first thought could be to assume that a small operating area is not obvious in the case of a relatively great width of the workpiece. As described above however, the invention is partly based on the insight that a smaller operating area can produce higher machining speeds.

It is noted that it is known per se to move a workpiece, for instance a material strip, under the scanner or scanners in order to perform a laser operation "on the fly". It is relatively time-consuming to move the scanner instead of a workpiece. Displacement of the workpiece is therefore for this reason alone a logical choice per se, since a workpiece, for instance a strip of material, is already in motion anyway in many production processes. Rolls of cardboard for instance are thus unrolled and processed into a product, for instance a blank for forming packages.

Moving a scanner in transverse direction relative to the displacement direction of the workpiece then only makes sense if it is also advantageous. The advantage only occurs at greater widths and in the case of particular operations, wherein cutting times or welding times become more favourable and other aspects may also play a part, such as less smoke formation during cutting and a smaller width of a welding zone, and therefore a smaller heat input during welding operations.

Moving a scanner in transverse direction relative to a workpiece can be considered time-consuming because for proper functioning of the device the following aspects, among others, are important:

the scanner must be moved over an extremely accurate guide, since otherwise problems can occur with the alignment and focussing of the laser beam;

the construction of the mirror suspension and the drive for the movement of the or each mirror in the scanner must be very stable to enable movement of the scanner on the fly with the required great accelerations and decelerations. It is important for this purpose that the or each rotation axis of the or each mirror of the mirror system substantially coincides with an axis of inertia thereof. Unnecessary forces of inertia due to imbalance are hereby avoided.

It will be apparent that this is not a problem with a fixed disposition of a scanner, nor is it if the scanner is displaced from one fixed position to the next fixed position.

Flying optics are also per se known. This is an optical system comprising at least one mirror and/or at least one lens, wherein the last mirror or lens usually has a focussing action The assembly of mirrors is herein moved in any necessary spatial direction, wherein the mirrors and/or lenses are also rigidly disposed during the movement within the optical system. It is also known that mirrors can move relative to each other within the system while the assembly moves, for instance in a device for laser-welding using a robot arm. In this known structure the assembly in question does not yet qualify as a scanner in the sense of the invention.

It is further noted that it is known to displace a scanner from the one position to the next position and to perform the operation, such as welding or cutting, in this position.

The operation of the device according to the invention is now such that the relative movement of the scanner in transverse direction relative to the displacement direction of the workpiece is for instance measured continuously, for instance by making use of an encoder. The measurement data in question is processed by a computer and converted into actuating values for the movements of the described optical elements in the scanner. After each passage of the scanner over the workpiece, this workpiece is displaced through the desired distance and the scanning cycle is repeated.

In a first particular embodiment of the invention the workpiece also moves on the fly simultaneously with the movement of the scanner. In this case the displacement speed of the workpiece is also measured, preferably continuously, using a second encoder. The computer calculates actuating values for the optical elements in the scanner on the basis of this data.

The two displacement directions of respectively the workpiece and the scanner generally lie substantially transversely of each other, although mutually exact perpendicular directions are not strictly necessary. Variations from a mutual angle of 90° are also permissible.

In a second particular embodiment the scanner moves on the fly transversely over a stationary workpiece and in each case herein performs the operations located on that side of the operating area which, relative to the direction of movement of the scanner, still lie for the shortest time within the then applicable operating area of the scanner. Once the scanner has come to a standstill at the edge of the workpiece, the workpiece is displaced under the scanner through a distance maximally equal to that corresponding to the relevant dimension of the operating area, wherein the displacement speed of the workpiece is measured by means of an encoder and the scanner performs the desired operations during the movement of the workpiece. In the performing of these operations there again applies the choice of those operations which still lie for the shortest time within the then applicable operating area of the scanner. After displacement of the workpiece the scanner can begin to move once more in transverse direction relative to the workpiece, this time in opposite direction to the preceding transverse movement. The above described embodiment is essentially a combination of operations on the fly in two successive, and therefore not simultaneous directions. An advantage is that the operations do take place continuously without waiting times for displacing the workpiece, for instance a material strip. Reference is also made in this respect to the example below relating to the laser cutting of jumbo rolls of sandpaper.

In a third particular embodiment of the present invention the scanner is moved, optionally simultaneously, on the fly in two directions over the workpiece. This embodiment can be applied if the dimension and the form of the workpiece are suitable for this purpose.

It is the case for all embodiments that the workpieces for machining do not have to be flat. The converging optical system can in principle correct to any known spatial position. It will be apparent that in the case of for instance a profiling, the data thereof must be measured or otherwise predetermined.

Examples of materials for machining, which can for instance be welded, cut and the like, are sandpaper (normally sandpaper with fibre backing, a hard type of backing manufactured from cotton and other materials onto which grains are glued, wherein the cutting operation takes place from the backing side, i.e. the side remote from the grain side), metals, for instance steels, plates, cardboard, corrugated board, plastic foil material, textile fabric, non-woven, paper, veneer wood, plastic, rubber and so on.

Reference is now made by way of example to the welding together of two steel plates by means of laser welding, for instance with welding zones consisting of circles and lines. The plate width can for instance be up to 2000 mm. Plate thickness 0.8–2.5 cm, plate length up to for instance 12000 mm. The usual circular welds can be functionally compared to spot welds; the line welds for mutually connecting for instance the plates at their outer edges can be compared to seam welds. After internal hydraulic deformation of the plates there results a per se known cushion plate which can be applied for instance as heat exchanger or as pressure vessel. For a good weld quality the flat plates must be pressed against each other during the welding, for instance by means of a pressure chuck. In respect of the relatively large mass of the plates, increased by that of the pressure chuck, it is not practical in this case to have these components move. In this case the above described third particular embodiment is applicable, wherein the scanner is moved in two directions over the workpiece in question. Since more welding work is also available on the edges of the plates than in the middle, the scanner speed will here also be adjusted once again to the amount of work available at that moment.

BRIEF DESCRIPTION OF THE DRAWINGS

The invention will now be elucidated on the basis of an embodiment. Use is made in this embodiment of a laser for cutting jumbo rolls of sandpaper into sanding discs. In the drawing:

FIG. 4 is a schematic top view of a part of the sandpaper strip having thereon a machining pattern and indications relating to the operations to be performed successively.

DETAILED DESCRIPTION OF THE INVENTION

Figure 1A:
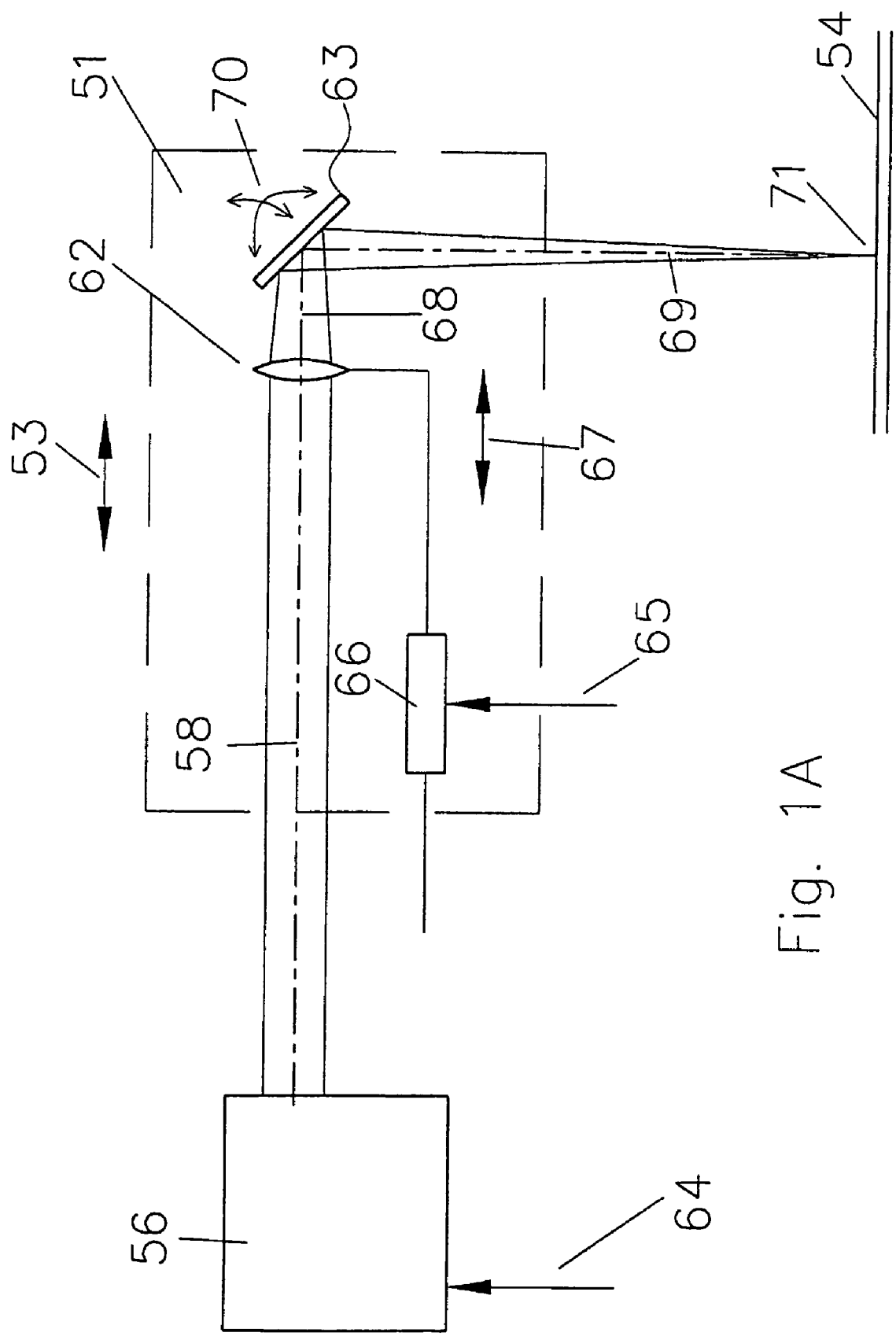
FIG. 1A shows a highly simplified schematic view of a converging optical system in a first position.
Figure 1B:
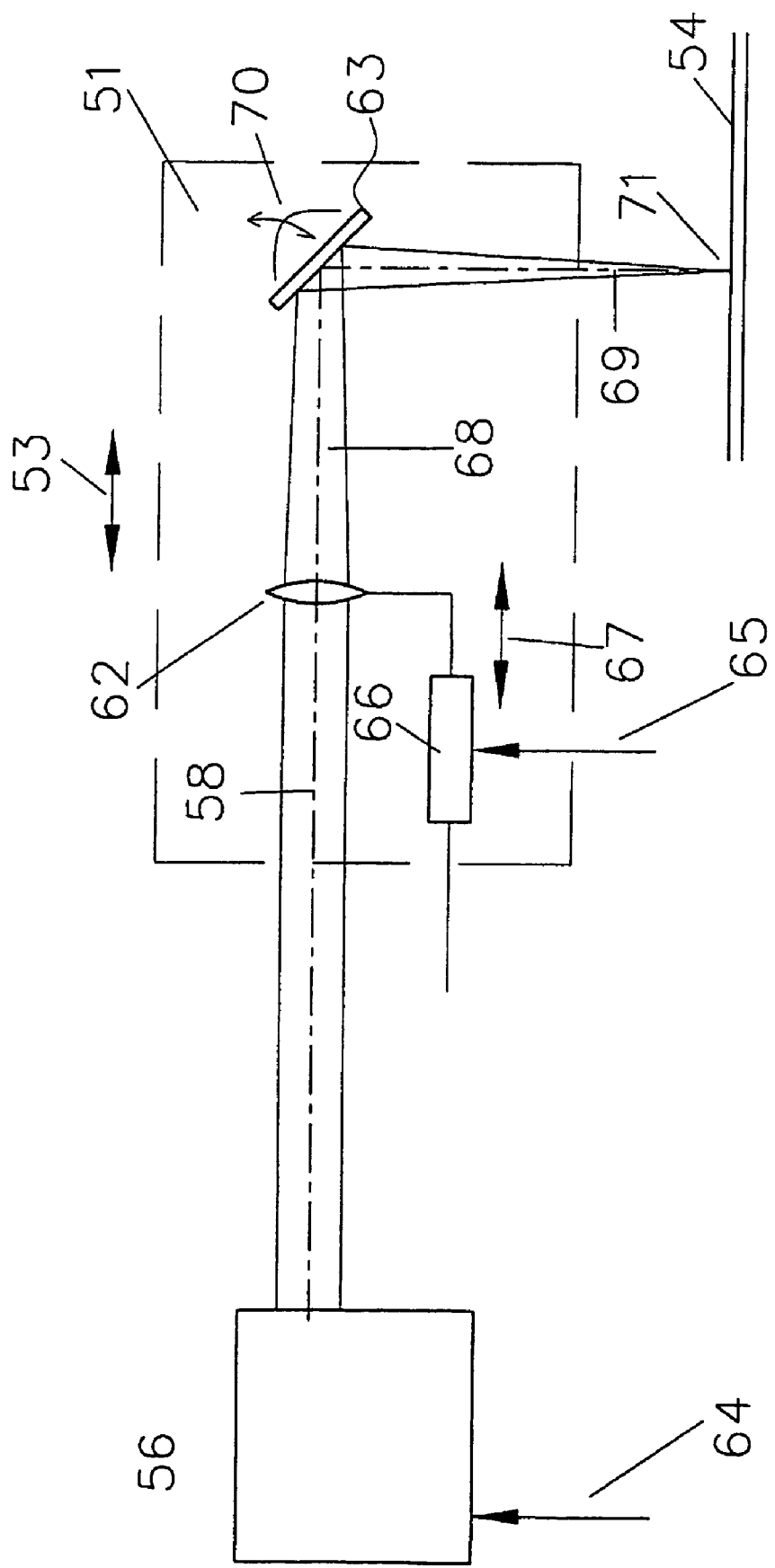
FIG. 1B shows a view corresponding with FIG. 1 of the system in another position.
Figure 3:
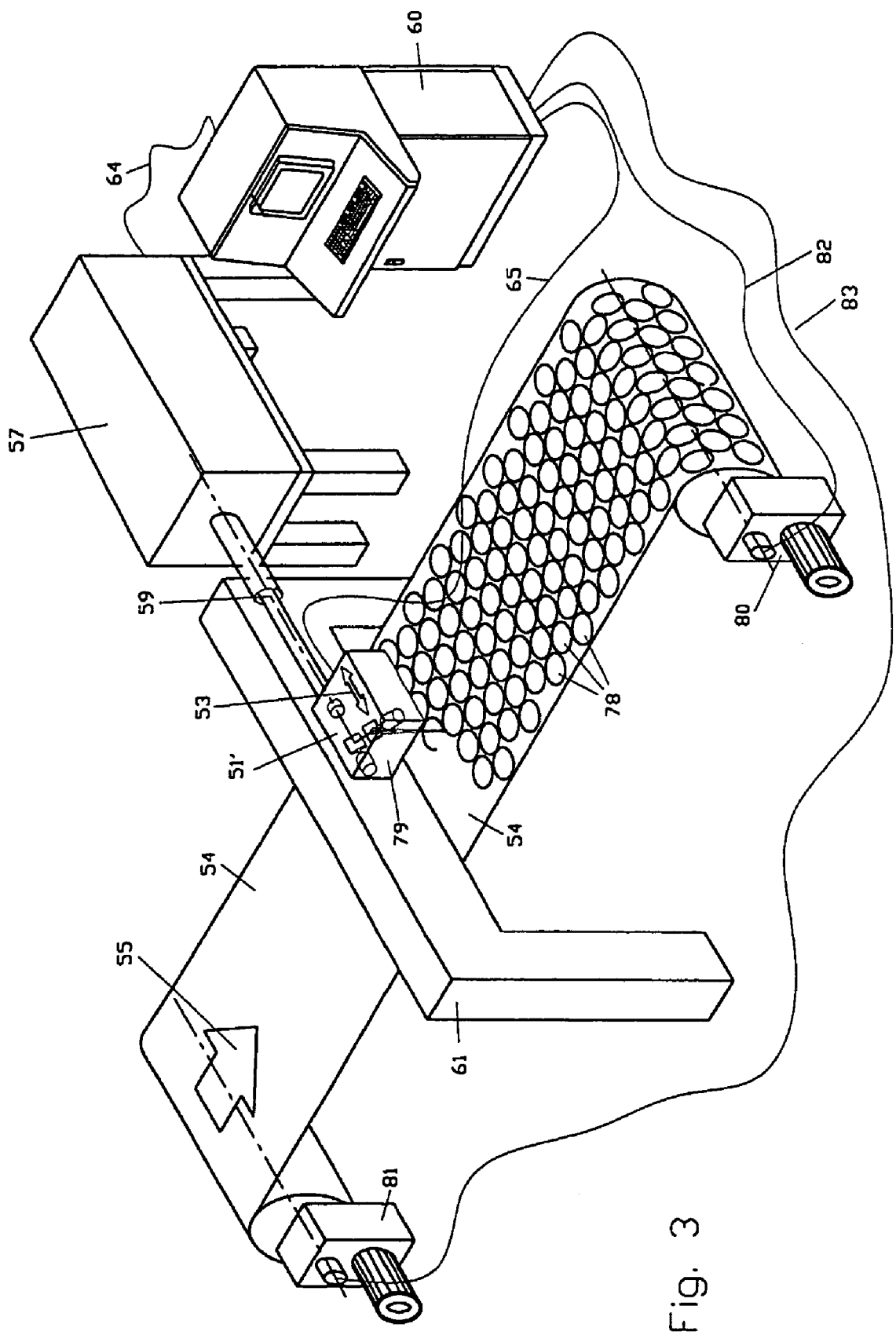
FIG. 3 shows a schematic perspective view of a device for laser-cutting jumbo rolls of sandpaper.

FIG. 1A and FIG. 1B show a highly simplified schematic view of a converging optical system and associated laser in a first convergence position. A laser 56, for instance an infrared laser, is fixedly disposed inside a housing 57 as shown in FIG. 3. Laser 56 generates a parallel beam 58 with a wavelength suitable for the relevant operation. It is for instance possible to envisage a $CO_2$-laser emitting radiation with a wavelength of about 10.7 μm. The beam 58 enters a scanner 51, designated in FIG. 1 with a broken line border, via a protection tube 59 as shown in FIG. 3. By means of linear drive means (not drawn) controlled by a computer 60 the scanner is movable in a transverse direction 53 relative to the transporting direction 55 of a strip 54 of sandpaper, and is accurately guided for this purpose along a stable frame 61.

In the scanner is situated a converging optical system, comprising a converging lens 62, which can for instance consist of silicon and which can be cooled in respect of the large output to be transmitted, and in this simple embodiment a single, cooled mirror 63 rotatable in two directions.

Computer 60 controls a laser 56 via a cable 64.

The computer further controls not only the linear drive means for moving the scanner 51, but also, via a cable 65, a linear drive 66 which carries the converging lens 62 for displacement in the direction designated with 67.

As shown in FIG. 1A, the system 62, 63 converges the parallel beam 58 onto workpiece 54. This implies that the sum of the distances 68 between lens 62 and mirror 63 on the one hand, and the distance 69 between mirror 63 and workpiece 54 is equal to the focal distance of lens 62. Two mutually perpendicular curved arrows 70 indicate symbolically that mirror 63 is rotatably drivable in two directions, for instance by means of a cardan suspension, such that the target point 71 can run through any desired path over workpiece 54. It should be understood that with a deviation from the drawn position the distance 69 changes, whereby the linear drive means 66 adjust the position of lens 62 correspondingly under the control of computer 60.

FIG. 1B shows the situation in which workpiece 54 is located at a higher position, or at least the part thereof to be machined at that moment, which has caused the computer 64 to actuate drive 66 such that lens 62 has displaced to the position shown in FIG. 1B. The target point 71 hereby corresponds once again with the focal point of lens 62.

Figure 2:
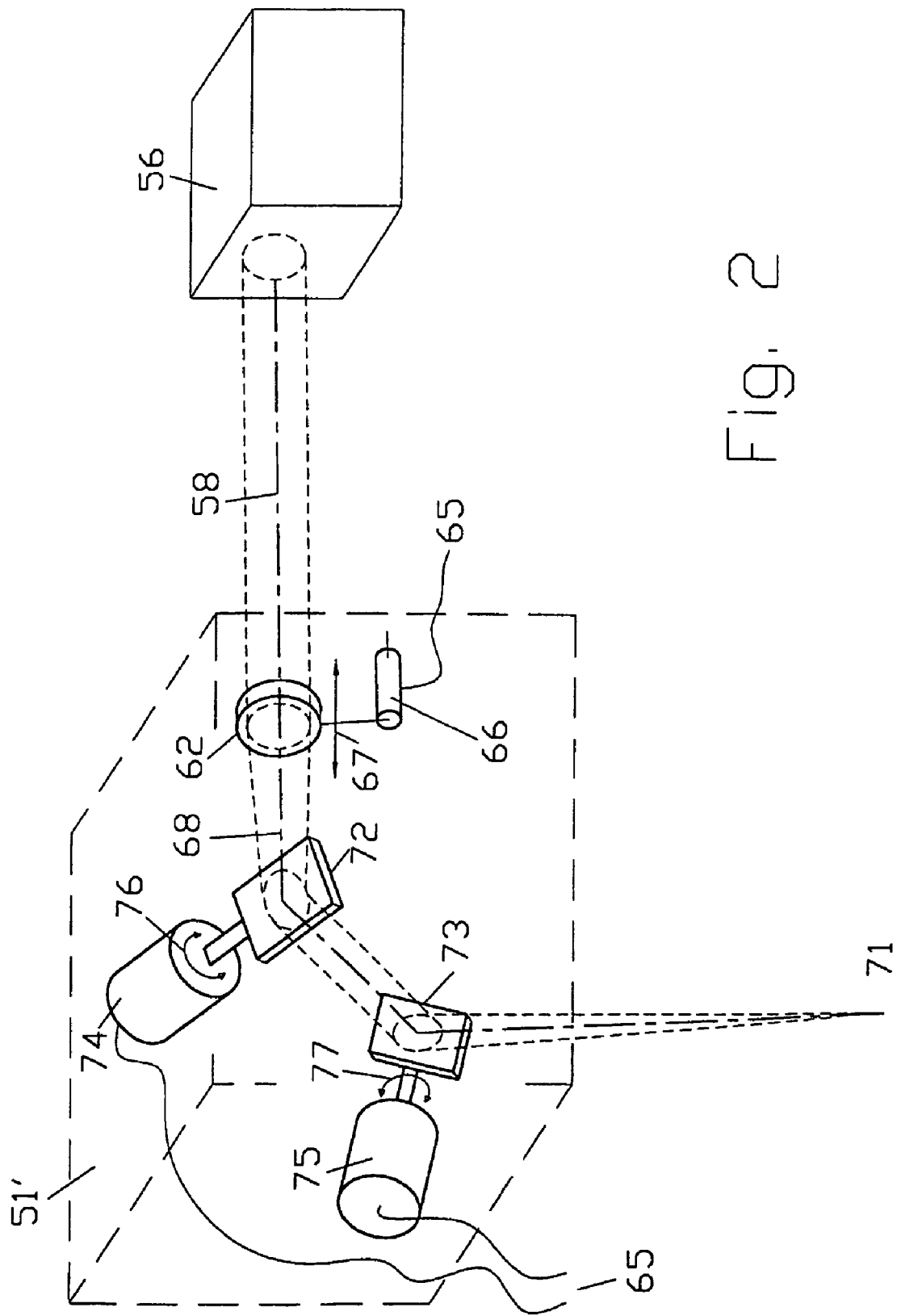
FIG. 2 shows a schematic view of a three-dimensional system which can be controlled by a computer to make the target point of the laser beam follow a desired path over the workpiece.

FIG. 2 shows an embodiment wherein use is made of two separate mirrors 72, 73. To each of these mirrors is added an individual sweeping drive, respectively 74, 75. Each of these rotating drives 74, 75 causes the relevant mirror 72, 73 to rotate according to respective arrows 76, 77 with sweeping movements such that the drives 74, 75 controlled by computer 60 place the relevant mirror at any moment in a position such that it corresponds with the point on the path to be followed by the target point 71 determined by the computer.

FIG. 3, which has already been partly discussed, shows a practical arrangement in which a material strip consisting of sandpaper has to be cut in accordance with a pattern 78 entered in advance into computer 60. In FIGS. 2 and 3 the scanner, comprising a housing 79 having therein lens 62, mirrors 72, 73 and drives 74, 75, is designated with reference numeral 51'.

Computer 60 also controls a winding motor unit 80 and a tensioning motor unit 81 via respective cables 82, 83. Under the influence hereof the sandpaper strip 54 is transported in the direction indicated with arrows 55. The speed prescribed by the computer is determined by means of a speed sensor (not drawn), for instance a tachometer, which presses on the sandpaper at a suitable location via a rubber wheel.

During the displacement at prescribed speed in transport direction 55 the sandpaper strip is cut in accordance with pattern 78 by a scanning movement, to be described hereinbelow, in the direction 53 transversely of the direction 55 of scanner 51', in combination with sweeping movements of mirrors 72 and 73 by means of actuators 74, 75 and longitudinal movement 67 of lens 62 under the control of linear drive 66.

As shown in FIG. 3, the pattern 78 is a pattern of the most dense stacking. It will be apparent that other patterns are also possible and advisable under certain conditions, depending on the shapes of the objects for cutting out.

FIG. 4 shows the sandpaper strip 54 on which circular discs of sandpaper are cut out by the laser operation via a different type of pattern, designated with 84.

As already described above, an operating area enclosed by an operating border 52 is defined by the output of laser 56 and the dimensioning of scanner 51', as well as the distance of scanner 51' above material strip 54.

Scanner 51 is now situated in a position corresponding to operating area 52. Scanner 51 first cuts out circles 1, 2 and 3. The scanner now begins to move in transverse direction 53 and successively cuts circles 4, 5, 6, 7 . . . 16, 17, 18. After cutting circle 19 the scanner is situated on the other side of material strip 54 and now first cuts circles 20 and 21. After cutting circle 21 the material strip can move in the transporting direction 55. Circles 22–30 are cut during transport. The transport of the material strip has meanwhile stopped and circles 31 and 32 are now cut, whereafter scanner 51 begins to move again and circles 33–37 are cut. The cutting out of the pattern in question is continued in this manner.

If, instead of circles of sandpaper, corrugated board blanks are for instance cut out as pre-form for a package, the same principle applies, wherein however the amount of available work is not usually distributed uniformly over the material strip width. In this case the speed of movement of the scanner and the transporting speed of the material strip are adjusted to the amount of work available at that moment within the then applicable operating border.

What is claimed is:

1. Device for machining a workpiece transportable in a chosen direction in accordance with a selected pattern by means of a focussed laser beam, for instance mutually connecting two metal plates over selected welding zones, cutting sandpaper pieces of selected shapes and dimensions from a continuous sandpaper strip, or the like, which device comprises:
   a computer;
   a laser controlled by the computer, for instance a $CO_2$-laser, with a continuous output of at least 200 W, which laser generates a substantially parallel beam;
   a scanner, comprising:
      a converging optical system for focussing the laser beam at a target point on the workpiece, with moving means for adjusting the spatial position and optionally the angular position of one or more components of the optical system such that the optical distance between said system and the target point is substantially constant and that the target point runs through a path corresponding with the selected pattern,
   which scanner has a chosen distance relative to the workpiece, whereby on the basis of the maximum laser output there is defined on the workpiece a certain operating area, of which the linear dimension transversely of the transporting direction is small relative to the dimension of the workpiece transversely of the transporting direction;
   transport means driven by a motor for transporting the workpiece in the chosen direction;
   displacing means controlled by the computer for displacing the scanner substantially perpendicularly of said chosen direction;

wherein the computer controls the device such that the machining takes place during the displacement of the scanner, the displacement speed is continuously adjusted to the amount of work available within the operating area of the scanner, and the dimensions of the target point have a chosen value at each point on its path.

2. Device as claimed in claim 1, wherein the scanner comprises:
   a converging lens system for focussing the laser beam at a target point, with computer-controlled linear displacing means for adjusting the position of the lens system such that the optical distance between said system and the target point is substantially constant; and
   a mirror system arranged downstream of the lens system having at least one flat mirror, with computer-controlled rotating means for adjusting the position of each mirror such that the target point runs through a path corresponding with the chosen pattern.

3. Device as claimed in claim 2, wherein the mirror system comprises two flat mirrors, each of which can be set into a sweeping movement by a rotating motor such that they can cause the laser beam to sweep in mutually perpendicular directions.

4. Device as claimed in claim 2, wherein the rotation means comprise two galvo-motors.

5. Device as claimed in claim 2, wherein the mirror system comprises two mirrors which can cause the laser beam to sweep in two mutually perpendicular directions.

6. Device as claimed in claim 1, wherein the dimensions of the target point are substantially equal at each point on its path.

7. Device as claimed in claim 1, wherein the transport means are driven intermittently such that they stand still during a machining phase.

8. Device as claimed in claim 1, wherein the computer control takes place such that the machining takes place at the highest possible speed.

9. Device as claimed in claim 1, wherein the optical system is free of lenses and only comprises a mirror system with at least one concave mirror, for instance a parabolic mirror.

10. Device as claimed in claim 1, particularly for cutting operations, wherein the dimensions of the target point are as small as possible.

11. Device as claimed in claim 1, wherein each rotation axis of each mirror of the mirror system substantially coincides with an axis of inertia thereof.

* * * * *